United States Patent
Han

(10) Patent No.: US 7,767,119 B2
(45) Date of Patent: Aug. 3, 2010

(54) GAS INJECTING DEVICE OF CYLINDER FOR INJECTION MOLDING MACHINE, AND METHOD FOR CONTROLLING AMOUNT OF GAS INJECTED INTO BARREL OF INJECTION MOLDING MACHINE

(75) Inventor: Dong Yub Han, Hwaseong (KR)

(73) Assignee: Plakor Co., Ltd., Hwaseong (KR)

( * ) Notice: Subject to any disclaimer, the term of this patent is extended or adjusted under 35 U.S.C. 154(b) by 1187 days.

(21) Appl. No.: 11/238,214

(22) Filed: Sep. 29, 2005

(65) Prior Publication Data

US 2007/0069409 A1 Mar. 29, 2007

(51) Int. Cl.
B29C 45/76 (2006.01)
(52) U.S. Cl. .................. 264/50; 264/328.1; 264/40.3
(58) Field of Classification Search .............. 425/584, 425/546, 563; 264/40.3, 50
See application file for complete search history.

(56) References Cited

U.S. PATENT DOCUMENTS

| | | | | |
|---|---|---|---|---|
| 3,981,649 A | * | 9/1976 | Shimano et al. | 425/4 C |
| 4,211,523 A | * | 7/1980 | Hunerberg | 425/4 C |
| 5,128,077 A | * | 7/1992 | Stevenson et al. | 264/410 |
| 5,660,369 A | * | 8/1997 | Gauler | 251/63.5 |
| 6,371,748 B1 | * | 4/2002 | Hara | 425/145 |
| 6,451,230 B1 | * | 9/2002 | Eckardt et al. | 264/40.3 |
| 6,824,379 B2 | * | 11/2004 | Doyle et al. | 425/564 |
| 2002/0086086 A1 | * | 7/2002 | Doyle et al. | 425/562 |
| 2003/0011090 A1 | * | 1/2003 | Yamaki | 264/40.3 |

FOREIGN PATENT DOCUMENTS

WO WO00/26005 * 5/2000

* cited by examiner

Primary Examiner—Joseph S Del Sole
Assistant Examiner—Kimberly A Stewart
(74) Attorney, Agent, or Firm—John K. Park; Park Law firm

(57) ABSTRACT

A gas injecting device for an injection molding machine is equipped at one side of a cylinder of the injection molding machine, and includes a pin inserted into a gas injection hole of the gas injecting device. The pin has flat sections formed around an outer lower portion of the pin to define gaps between the flat sections and an inner surface of the gas injection hole, such that a gas is injected uniformly through the gaps, thereby allowing the gas and a resin to be easily mixed while preventing the resin from flowing backwards through the gas injecting device. An amount of gas injected to a barrel of the injection molding machine is accurately controlled according to a pressure difference between a gas line and the barrel, and time data, allowing an article to be injection molded according to a kind of resin or characteristics of the article.

14 Claims, 10 Drawing Sheets

GAS INJECTING DEVICE OF CYLINDER FOR INJECTION MOLDING MACHINE, AND METHOD FOR CONTROLLING AMOUNT OF GAS INJECTED INTO BARREL OF INJECTION MOLDING MACHINE

BACKGROUND OF THE INVENTION

1. Field of the Invention

The present invention relates to a gas injecting device of a cylinder for an injection molding machine, and a method for controlling an amount of gas injected into a barrel of the injection molding machine.

2. Description of the Related Art

Generally, with an injection molding machine for injection (extrusion) molding a material into an injection (extrusion) molded article, microcellular foam processing has been used for weight reduction of the article while enhancing reproducibility, and dimensional precision of the article. For this purpose, conventional microcellular foam processing uses a technique for producing micro bubbles in the polymeric material for injection molding in order to reduce the weight of the plastic article. One of the conventional injection molding machines using this technique, as disclosed in PCT/US1999/026192, includes a gas injecting device equipped at one side of a cylinder of the injection molding machine, and having a small-sized gas spraying orifice formed at a distal end of the gas injecting device to finely inject gas in order to provide a mixture of the gas and a molten resin.

However, the conventional injection molding machine of the disclosure has problems in that, when an internal pressure of the cylinder is lower than an injection pressure of the gas during injection of the gas into the cylinder, the molten resin flows backwards through the gas injecting device, and often solidifies, causing clogging of the gas spraying orifice.

In other words, for the conventional microcellular foam processing by the injection molding machine of the disclosure, since the gas is injected from the gas injecting device in a state of being opened, the high internal pressure of the cylinder can cause backflow of the molten resin through the gas injecting device, and in this case, the molten resin is solidified to cause the clogging of the gas spraying orifice, thereby failing to ensure accurate injection of the gas, and providing defective products. In addition, since the solidified resin is difficult to remove from the conventional foam processing, cleaning of the solidified resin is laborious, and time consuming, thereby lowering work efficiency.

Briefly, conventional microcellular foam processing has problems in that the injection pressure of the gas is lowered due to the orifice phenomenon, causing the backward flow of the molten resin through the gas injecting device, and in that, when a screw positioned within the cylinder is rotated, the internal pressure of the cylinder is increased above the injection pressure of the gas, causing the backflow of the molten resin towards the gas spraying orifice of a low pressure to cause the clogging of the gas spraying orifice. In addition, with the conventional microcellular foam processing, the gas is directly injected at a high pressure through the gas spraying orifice, so that the gas cannot be effectively mixed with the molten resin, thereby failing to obtain an article of an accurate weight.

Conventional injection molding is an injection process wherein, after melting a resin, in particular, a polymeric material, at a high temperature, the molten resin is injected into a cavity of an injection mould at a high speed with a considerably high pressure. It is a fundamental principle of the injection molding that an injection molding machine is attached to the mould, and is operated to inject the molding material (polymeric material) such that the mould is filled with the material.

When injection molding the polymeric material into the article which is usually formed with a thick portion due to requirement for reinforcement of the article, a molding process is employed, in which air or gas is injected into the molten resin during the injection molding in order to prevent the article from being defective via deformation or shrinkage of the article due to retardation of cooling at the thick portion.

In other words, in the conventional injection molding machine, the gas injecting device is equipped at one side of a barrel to inject gas, and has a small-sized gas spraying orifice formed at a distal end of the gas injecting device to finely inject gas into the barrel through the gas injecting device, so that, when the gas and the molten resin are injected into the barrel, bubbles are formed in the molten resin as the gas and the molten resin are mixed in the barrel.

Typically, it has been considered that, when the article is injection molded by the injection molding machine, it can have suitable properties through control of injection time and amount of the gas injected along with the resin into the barrel according to characteristics of the article or kinds of the resin used as a raw material of the article. However, in the conventional injection molding, since the amount of the gas injected together with the resin into the barrel is not controlled irrespective of the kinds of the resin or the characteristics of the article, the injection molding is not performed corresponding to the kinds of the resin or the characteristics of the article.

SUMMARY OF THE INVENTION

The present invention has been made to solve the above problems, and it is an object of the present invention to provide a gas injecting device for an injection molding machine, which is equipped at one side of a cylinder of the injection molding machine, and has a pin equipped in the gas injecting device to define gaps between an outer surface of the pin and an inner surface of the gas injecting device so as to allow the gas to be injected via the gaps, thereby allowing easy formation of a mixture of the gas and a molten resin while preventing the molten resin from flowing backward through the gas injecting device.

It is another object of the present invention to provide a method for controlling an amount of gas injected together with a molten resin into a barrel of an injection molding machine, which is performed such that the amount of the gas can be accurately controlled depending on elapsed time on the basis of time data supplied from a separate timer and a pressure difference between a gas line and the barrel, thereby enabling injection molding of an article so as to match to characteristics of the article or kinds of the resin used as a raw material of the article.

In accordance with one aspect of the present invention, the above and other objects can be accomplished by the provision of a gas injecting device equipped at one side of a cylinder for an injection molding machine to inject gas into the cylinder, comprising: a gas injection hole formed at a center of the gas injecting device; fixing holes formed at both sides of the gas injection hole to fasten the gas injecting device to the cylinder with fixing bolts; and a pin fastened into the gas injection hole, the pin having a plurality of flat sections uniformly spaced from each other around an outer lower portion of the pin, a gas flow path extending vertically along a center of the pin, and a gas spraying orifice formed horizontally at a middle portion of the pin so as to allow the gas to be injected to the cylinder through gaps between the flat sections and an inner surface of the gas injection hole, and the gas injecting device is equipped on a planar surface formed at the one side of the cylinder.

Preferably, the gas is injected to the cylinder through the gas spraying orifice after passing through the gaps formed between the flat sections and the inner surface of the gas injection hole when the pin is inserted and fastened to the gas injection hole.

Preferably, the pin inserted to the gas injection hole has the plurality of flat sections formed and uniformly spaced from each other around the outer lower portion of the pin.

In accordance with another aspect of the present invention, the present invention provides a method for controlling an amount of gas injected into a barrel of an injection molding machine, comprising the steps of: a) opening a needle valve of an actuator to allow the gas to be injected from a gas compressor to a gas line until a pressure of the gas line rises to a predetermined level, when a gas injecting device of the injection molding machine is turned on; b) closing the needle valve of the actuator when the pressure of the gas line rises to the predetermined level, followed by detecting whether or not a screw is rotated through analysis of a detection signal from a screw rotating detection sensor; c) detecting a pressure of the gas line and a pressure of the barrel changed according to the rotation of the screw if it is determined that the screw starts rotating, followed by detecting whether or not a pressure difference between the gas line and the barrel reaches a predetermined level; d) opening a gas control valve to allow the gas to be injected from the gas line to the barrel while monitoring changes in pressures of the gas line and the barrel, if it is determined that the pressure difference between the gas line and the barrel reaches the predetermined level; and e) closing the gas control valve while opening the needle valve of the actuator to allow the gas to be injected from the gas compressor to the gas line, if it is determined that the pressure difference between the gas line and the barrel reaches the predetermined level.

Preferably, the pressure of the gas line as a reference for opening or closing of the needle valve of the actuator, and the pressure difference between the gas line and the barrel as a reference for opening or closing of the gas control valve are preset to certain values according to a kind of resin or characteristics of an article to be produced through injection molding, respectively.

Preferably, the pressure difference between the gas line and the barrel for opening the gas control valve is 2,000 psi, and the pressure difference between the gas line and the barrel for closing the gas control valve is 1,000 psi.

In accordance with yet another aspect of the present invention, the present invention provides a method for controlling an amount of gas injected into a barrel of an injection molding machine, comprising the steps of: a) reading pressures of a gas line and the barrel through analysis of detection data from pressure sensors after switching a controller and a display on in a state wherein a gas is compressed to 400 bars or more in a gas compressor; b) opening a needle valve of an actuator to allow the gas to be injected to the gas line until the pressure of the gas line rises to a predetermined level when a predetermined period of time has passed after a trigger signal is input; c) closing the needle valve of the actuator while detecting whether or not a detection signal is transmitted from a screw rotating detection sensor of the injection molding machine, if it is determined that the pressure of the gas line rises to the predetermined level; d) opening a gas control valve to allow the gas to be injected from the gas line to the barrel if it is determined that the detection signal is input from the screw rotating detection sensor; e) detecting a pressure of the gas line and a pressure of the barrel while injecting the gas from the gas line to the barrel, followed by displaying the pressures on a display; and f) closing the gas control valve and opening the needle valve of the actuator to allow the gas to be injected from the gas compressor to the gas line while preventing the gas from being injected to the barrel, if it is determined that the pressure of the gas line is lowered to a predetermined level or less due to gas injection from the gas line to the barrel.

Preferably, the pressures of the gas line for selecting an opening or closing time of the needle vale of the actuator acting to control gas injection to the gas line and for selecting an opening or closing time of the gas control valve acting to control the gas injection to the barrel of the injection molding machine are preset to certain values according to a kind of resin or characteristics of an article to be produced through injection molding.

In accordance with yet another aspect of the present invention, the present invention provides a method for controlling an amount of gas injected to a barrel of an injection molding machine, comprising the steps of: a) awaiting an instruction for opening or closing of a gas control valve from a controller while maintaining a closed state of the gas control valve for a predetermined time after receiving a detection signal from a screw rotating detection sensor of the injection molding machine; b) opening the gas control valve to allow the gas to be injected along with a molten resin to the barrel according to an instruction for opening of the gas control valve from the controller with passage of the predetermined time after receiving the detection signal from the screw rotating detection sensor; c) closing the gas control valve according to an instruction for closing of the gas control valve from the controller, while opening the needle valve of the actuator to allow the gas to be injected to the gas line connected to the barrel according to an instruction for opening of the needle valve of the actuator from the controller, after injecting the gas to the barrel for a predetermined time on the basis of time data from a timer in a state wherein the gas control valve is open; and d) closing the needle valve of the actuator to cutoff gas injection to the gas line connected to the barrel according to an instruction for closing of the needle valve of the actuator from the controller after the gas is injected to the gas line connected to the barrel of the injection molding machine until the pressure of the gas line rises to a predetermined level.

Preferably, an opening or closing time of the gas control valve for controlling the gas injected to the barrel, and the pressure of the gas in the gas line connected to the barrel are preset to certain values according to a kind of the resin or characteristics of an article to be produced through injection molding.

Preferably, the gas is injected under a predetermined pressure to the gas line connected to the barrel before a screw of the injection molding machine starts rotating.

In accordance with yet another aspect of the present invention, the present invention provides a method for controlling an amount of gas injected into a barrel of an injection molding machine, comprising the steps of: a) opening a needle valve of an actuator to allow the gas to be supplied from a gas compressor to a gas line until a pressure of the gas line rises to a predetermined level when a gas injecting device of the injection molding machine is turned on; b) closing the needle valve of the actuator while monitoring whether or not a screw is rotated through analysis of a detection signal from a screw rotating detection sensor, if it is determined that the pressure of the gas line rises to the predetermined level; c) opening a gas control valve to allow the gas to be injected from the gas line to the barrel while detecting whether or not a pressure of the barrel rises to a predetermined level, when a predetermined time of period has passed after the screw starts rotating; d) detecting whether or not the pressure of the barrel is lowered again to a predetermined level, if it is determined that the pressure of the barrel rises to the predetermined level; and e) closing the gas control valve to cutoff the gas injection to the barrel while opening the needle valve of the actuator to allow the gas to be injected from the gas compressor to the gas line, if it is determined that the pressure of the barrel is lowered to the predetermined level.

Preferably, the pressure of the gas line as a reference for opening or closing of the needle valve of the actuator, and the pressure of the barrel as a reference for opening or closing of the gas control valve are preset to certain values according to a kind of resin or characteristics of an article to be produced through injection molding, respectively.

In accordance with yet another aspect of the present invention, the present invention provides a method for controlling an amount of gas injected to a barrel of an injection molding machine, comprising the steps of: a) awaiting an instruction for opening or closing of a gas control valve from a controller while maintaining a closed state of the gas control valve for a predetermined time after receiving a detection signal from a screw rotating detection sensor of the injection molding machine; b) opening the gas control valve to allow the gas to be injected along with a resin to the barrel according to an instruction for gas injection to the barrel from the controller with passage of the predetermined time after receiving the detection signal from the screw rotating detection sensor; c) detecting a pressure of the gas line and a pressure of the barrel changed as a result of the gas injection through the open gas control valve while monitoring whether or not a pressure difference between the gas line and the barrel is lowered to a predetermined level or less; d) closing the gas control valve to cutoff the gas injection to the barrel according to an instruction for cutting off of the gas injection to the barrel from the controller, while opening the needle valve of the actuator to allow the gas to be supplied from the gas compressor to the gas line according to an instruction for the gas injection to the gas line connected to the barrel, if it is determined that the difference between the pressure of the gas line and the pressure of the barrel is lowered to the predetermined level or less; and e) closing the needle valve of the actuator to cutoff the gas injection to the gas line connected to the barrel according to an instruction for closing of the needle valve of the actuator from the controller, when the gas is injected to the gas line connected to the barrel of the injection molding machine until the pressure of the gas line rises to a predetermined level.

Preferably, a pressure difference between the gas line and the barrel as a reference for closing the gas control valve, and the pressure of the gas line connected to the barrel are preset to certain values according to a kind of resin or characteristics of an article to be produced through injection molding, respectively.

Preferably, the gas is injected under a predetermined pressure to the gas line connected to the barrel before a screw of the injection molding machine starts rotating.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Figure 1:
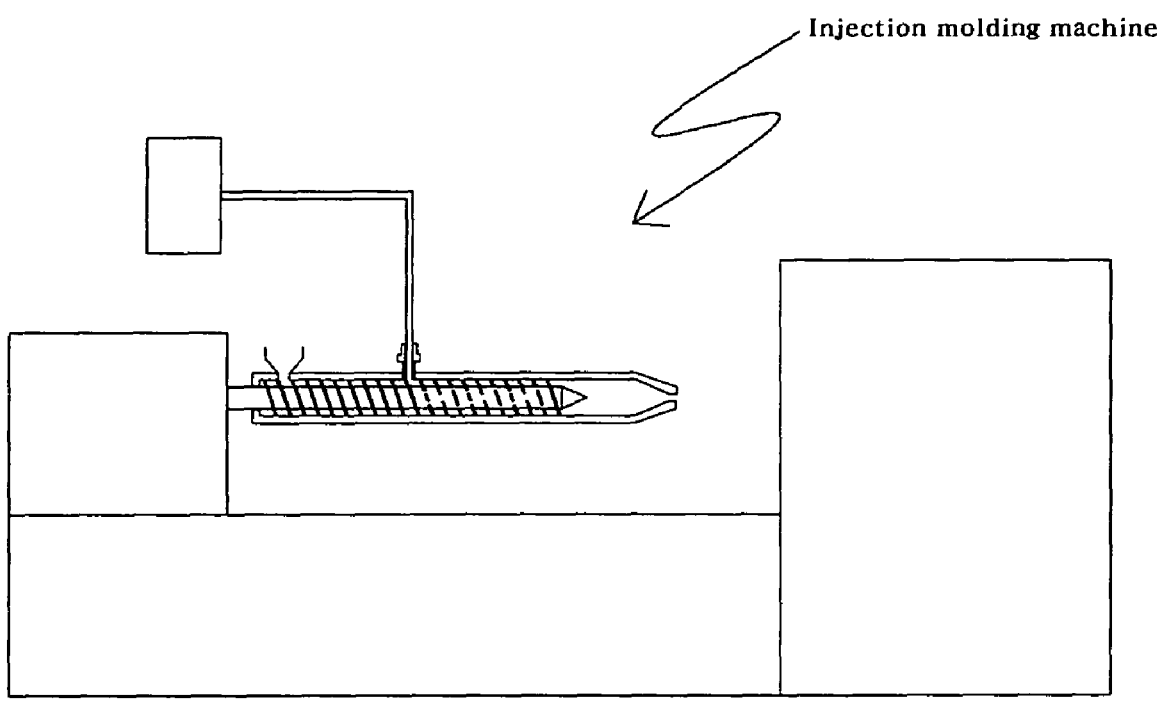
FIG. 1 is a schematic side sectional view illustrating the overall construction of an injection molding system in accordance with the present invention.
Figure 2:
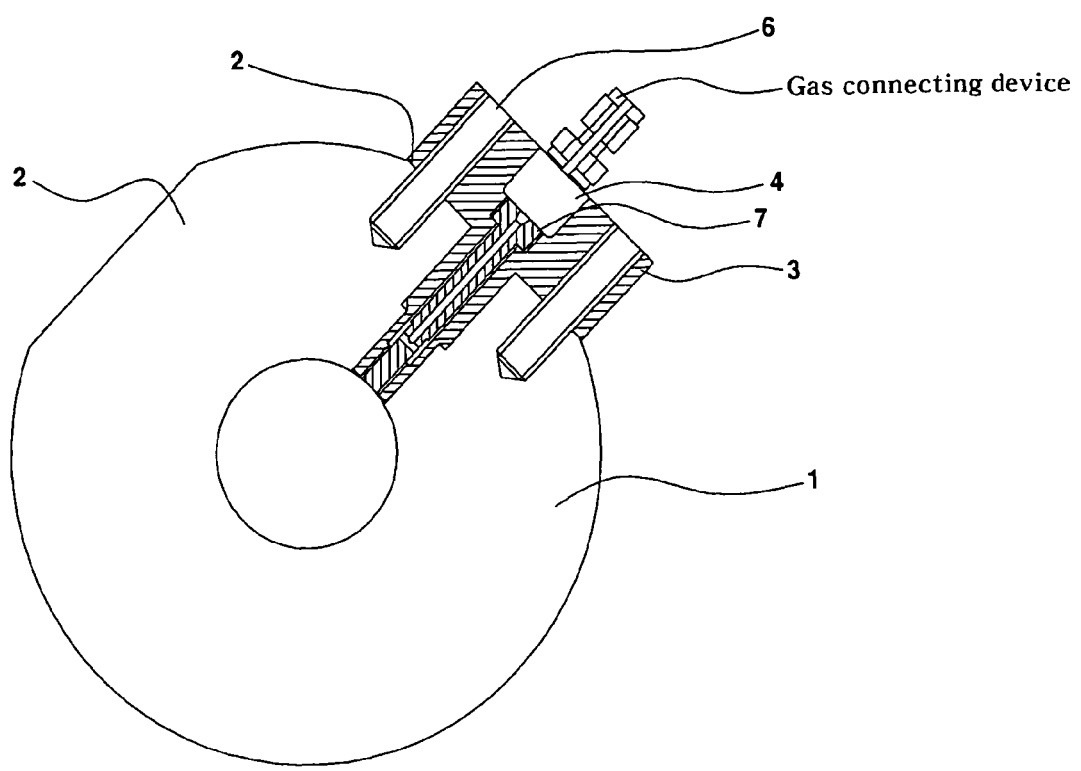
FIG. 2 is a schematic horizontal cross-sectional view illustrating a gas injecting device equipped to an injection molding machine in accordance with the present invention.
Figure 3:
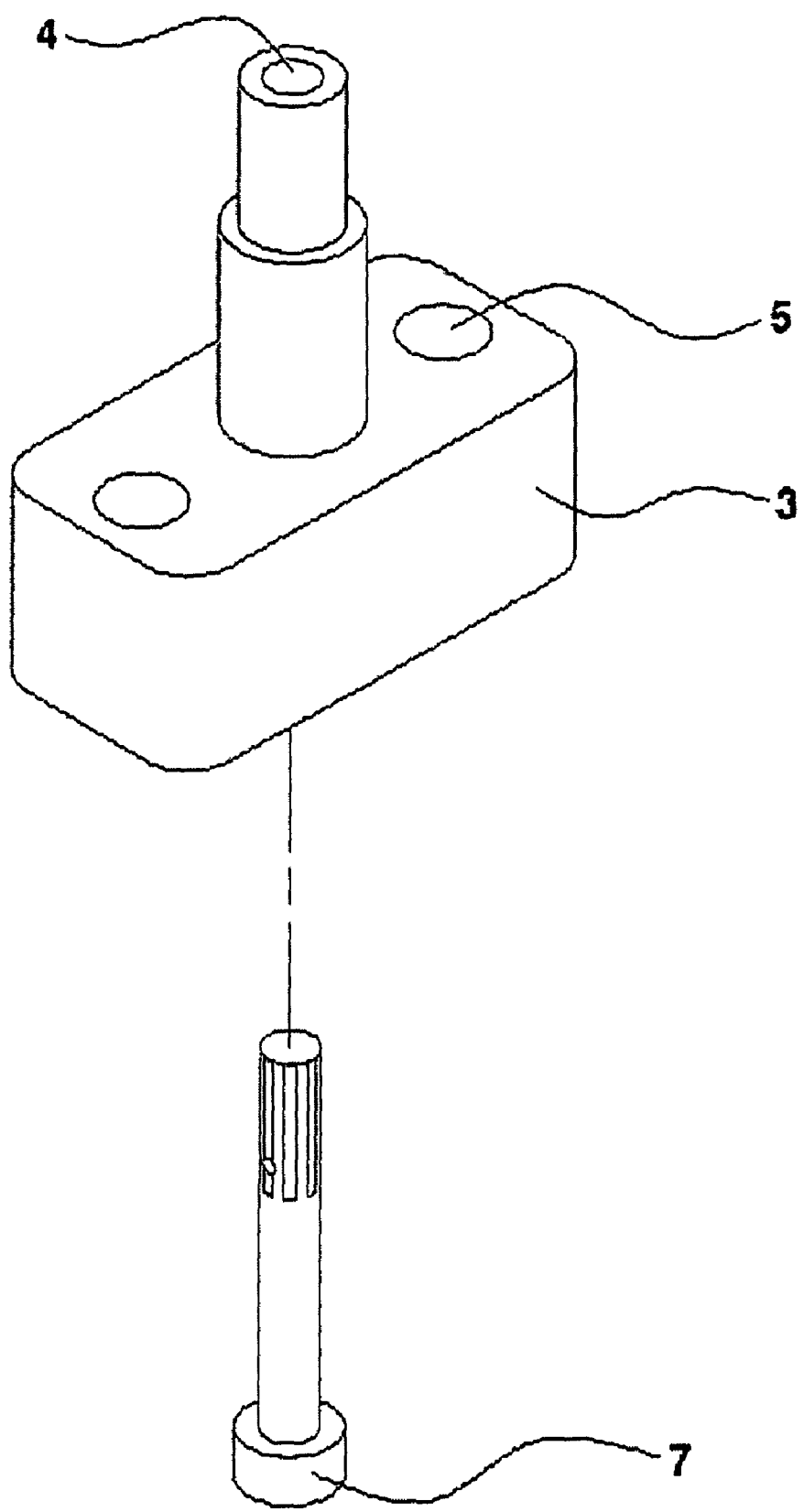
FIG. 3 is an exploded perspective view illustrating the gas injecting device.

Preferred embodiments of the present invention will be described in detail with reference to the accompanying drawings.

FIGS. 1 to 6 show a gas injecting device of a cylinder for an injection molding machine in accordance with the present invention. Referring to FIGS. 1 to 6, the gas injecting device 3 of the invention is equipped at one side of a cylinder of the injection molding machine. Specifically, the gas injecting device 3 is equipped on a planar surface 2 formed at the one side of the cylinder 1, and comprises a gas injection hole 4 formed at a center of the gas injecting device 3, fixing holes 5 formed at both sides of the gas injection hole 4 to fasten the gas injecting device 3 to the cylinder 1 with fixing bolts 6, and a pin 7 fastened into the gas injection hole 4. The pin 7 has a plurality of flat sections 7' uniformly spaced from each other around a lower portion of the pin 7, a gas flow path 8 extending vertically along a center of the pin 7, and a gas spraying orifice 9 formed horizontally at a middle portion of the pin 7 so as to allow the gas to be injected through a space between the flat sections and the gas injection hole 4.

In other words, the pin 7 is inserted and fastened to the gas injection hole 4 formed along the center of the gas injecting device 3, and is fixed by a fastener equipped to a gas connecting device positioned above the pin 7. Then, the gas injecting device 3 is firmly fixed to the cylinder 1 by fastening the fixing bolts 6 to the fixing holes 5 formed at both sides of the gas injection hole 4.

In this state, when a molten resin is conveyed from an interior of the cylinder 1, a gas is supplied from the gas injecting device 3. Then, the gas flows towards a lower end of the gas injecting device 3 through the gas flow path 8 formed along the center of the pin 7, and sprayed to the gas spraying orifice 9 formed at a lower end of the gas flow path 8. As a result, the gas can flow to an interior of the cylinder 1 through gaps between the flat sections 7' vertically formed on the pin 7 and an inner surface of the gas injection hole 4 of the gas injecting device 3.

Figure 4:
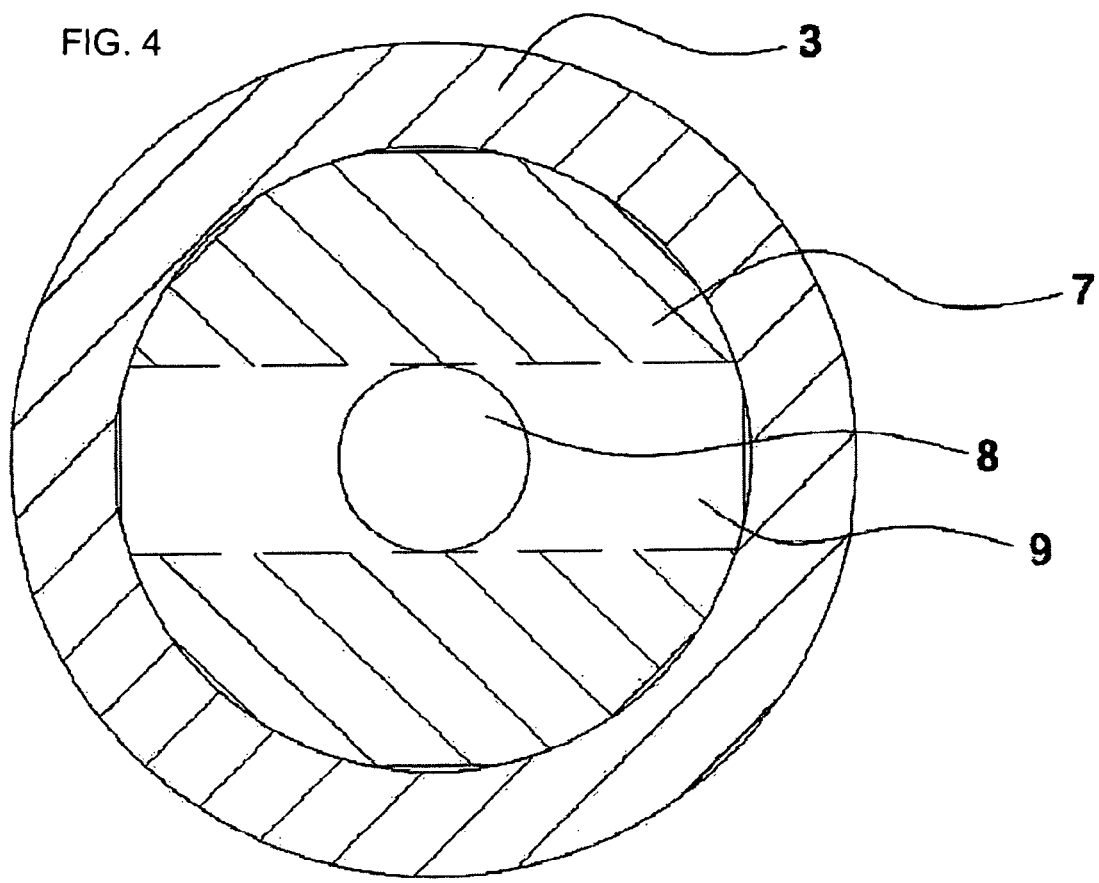
FIG. 4 is an enlarged horizontal cross-sectional view illustrating a major part of the gas injecting device, in which a gas spraying orifice is shown.
Figure 5:
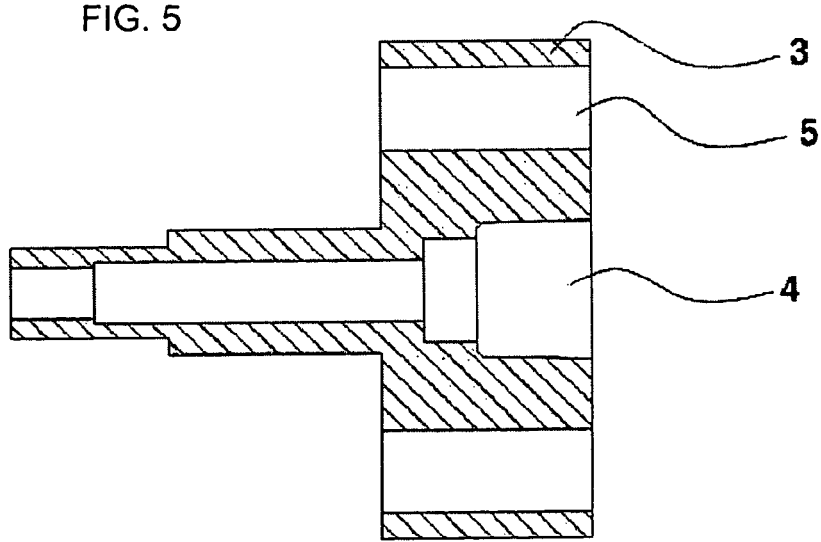
FIG. 5 is a side sectional view illustrating the gas injecting device.
Figure 6:
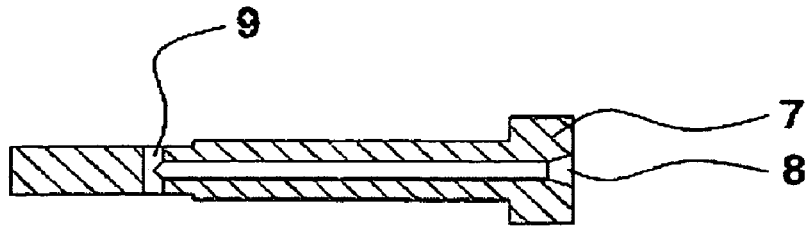
FIG. 6 is a side sectional view illustrating a pin of the gas injecting device.

At this time, since the plurality of flat sections 7' are uniformly spaced from each other around the lower portion of the pin 7 as shown in FIG. 4, the gas can flow into the cylinder 1 in a finely injected state rather than in a bulk state under high pressure, so that the gas can be easily mixed with the resin.

Meanwhile, when a screw positioned in the cylinder 1 is operated to inject the resin, the resin is compressed. However, according to the present invention, even though the resin is compressed for injection molding, the pin 7 acts to shield the gas injection hole 4 through which the gas is injected, thereby preventing the resin from flowing backwards.

That is, since the gas injection hole 4 formed in the gas injecting device 3 is shielded by the pin 7, and the gaps formed between an outer lower surface of the pin 7 and an inner surface of gas injection hole 4 form fine passages while enabling the gas to be continuously injected into the cylinder 1, the molten resin is prevented from flowing backward to the gas injection hole 4.

Figure 7:
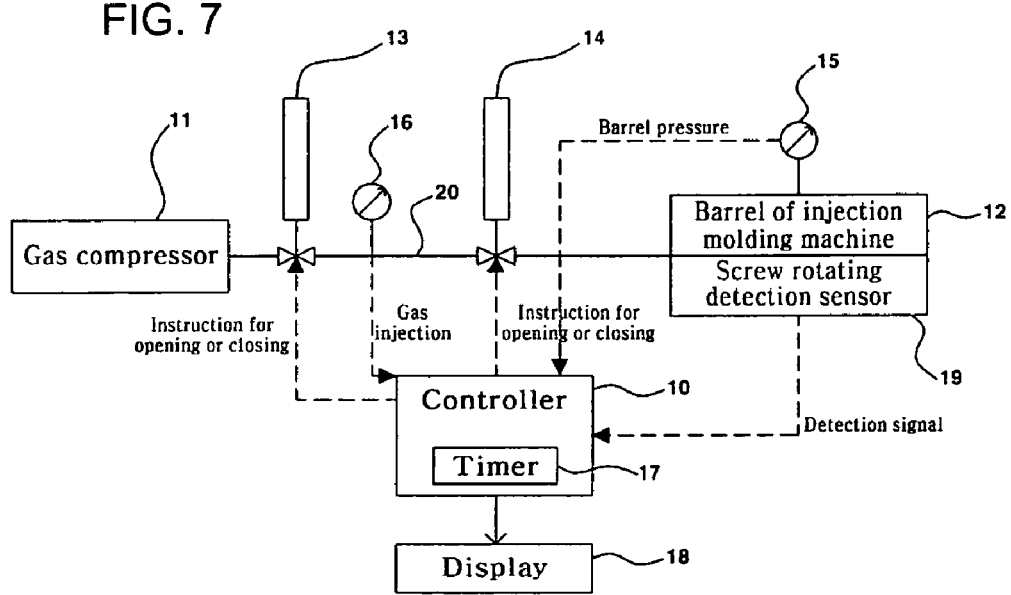
FIG. 7 is a diagram illustrating a system for controlling an amount of gas injected into a barrel of the injection molding machine in accordance with the present invention.

FIG. 7 is a diagram illustrating a system for controlling an amount of gas injected into a barrel of an injection molding machine in accordance with the present invention. With this system, a predetermined article is injection molded by injecting a resin as a raw material, and a gas, for example, nitrogen gas into a barrel 12 of the injection molding machine.

The barrel 12 of the injection molding machine is adapted to receive the resin and the gas. The barrel 12 comprises a screw rotating detection sensor 19 to generate a detection signal according to rotation of a screw and supply the detection signal to a controller 10, and a pressure sensor 15 to detect an internal pressure of the barrel 12 and supply the internal pressure of the barrel 12 to the controller 15.

In addition, the injection molding machine further comprises a gas control valve 14 to control an amount of the gas injected from a gas compressor 11 to the barrel 12 through a gas line 20, and an actuator needle valve 13 to control an amount of the gas supplied from the gas compressor 11 to the gas line 20 connected to the barrel 12. A pressure sensor 16 is mounted on the gas line 20 to detect a pressure of the gas line 20 and supply the pressure of the gas line 20 to the controller 10.

After receiving the detection signal from the screw rotating detection sensor 19, the pressure of the barrel 12 from the pressure sensor 15, and the pressure of the gas line 20 from the pressure sensor 16, the controller 10 controls the amount of the gas injected to the barrel 12 of the injection molding machine by outputting an instruction to selectively open or close the gas control valve 14 and the actuator needle valve 13 on the basis of a difference between the pressure of the gas line 10 and the pressure of the barrel 12, and time data supplied from a timer 17 in order to injection mold the predetermined article.

In FIG. 7, reference numeral 18 indicates a display.

FIGS. 8 to 12 are flow diagrams illustrating a method for controlling an amount of gas injected into the barrel of the injection molding machine in accordance with embodiments of the present invention.

Figure 8:
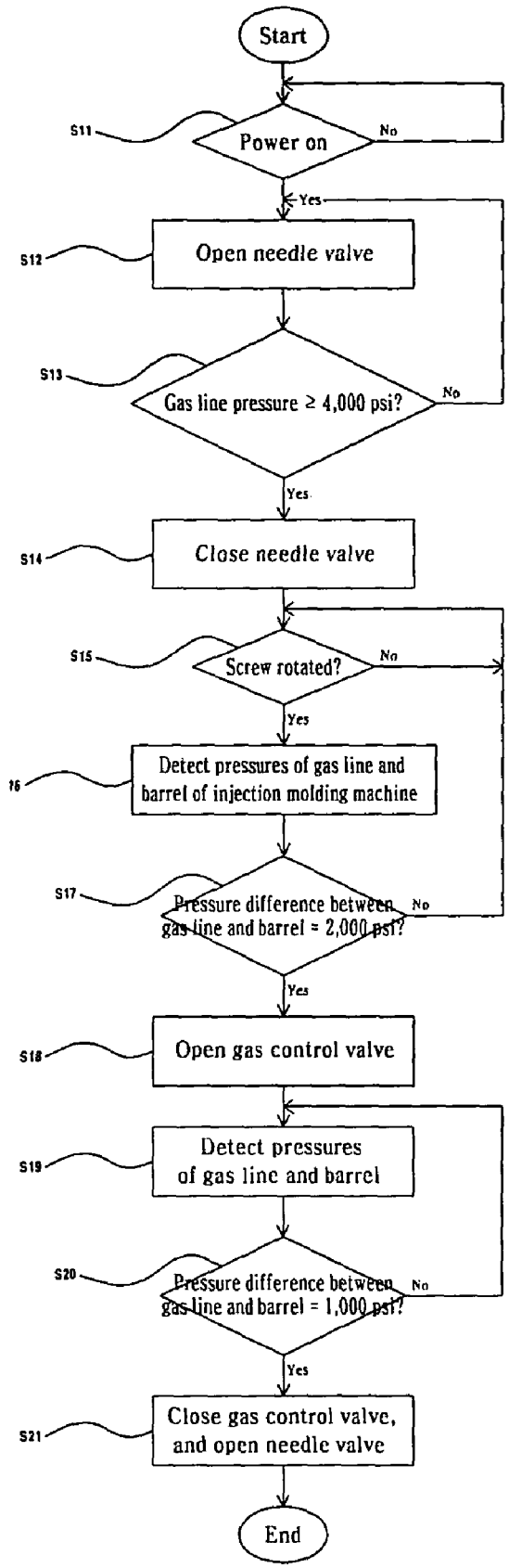
FIGS. 8 to 12 are flow diagrams illustrating methods for controlling an amount of gas injected into the barrel of the injection molding machine in accordance with various embodiments of the present invention.
Figure 9:
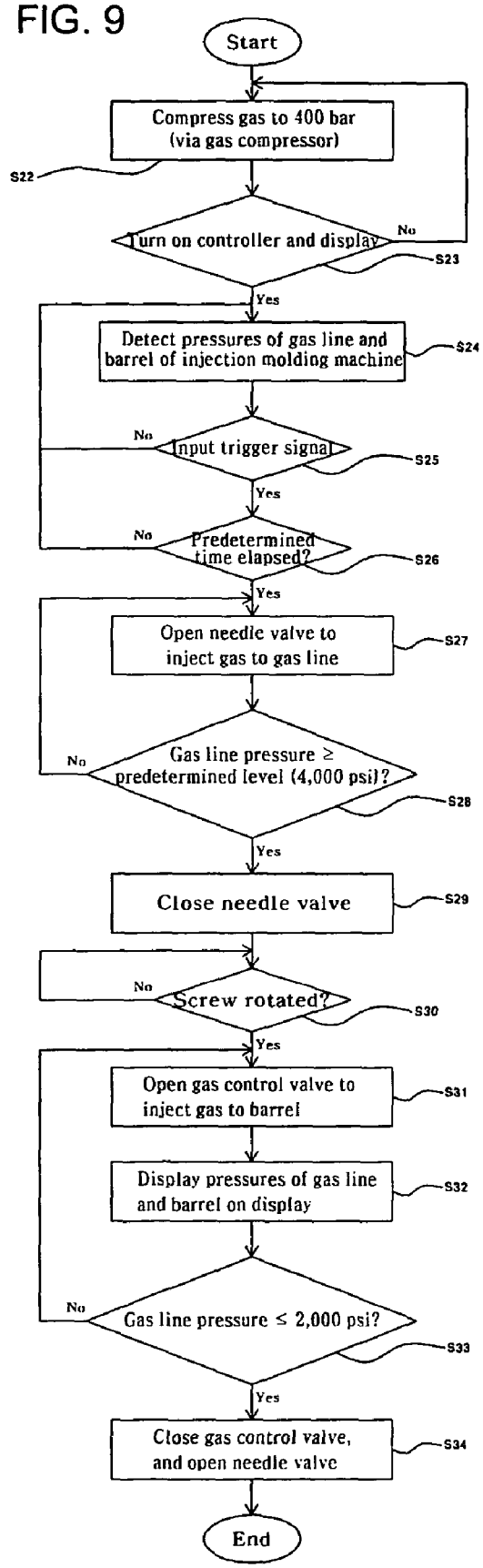

FIG. 8 is a flow diagram illustrating a method for controlling an amount of gas injected to the barrel of the injection molding machine via change in pressure of the gas line and the barrel according to a first embodiment of the invention. According to the first embodiment, at first, power is turned on in order to drive the injection molding machine comprising the gas injecting device (S11). Then, the controller 10 issues an instruction for gas injection into the gas line 20 to the actuator needle valve 13, thereby injecting a gas from the gas compressor 11 to the gas line 20 (S11).

During the gas injection from the gas compressor 11 to the gas line 20, the controller 10 detects whether or not a pressure of the gas line 20 rises to a predetermined level (4,000 psi), i.e. a pressure sufficient for gas injection into the barrel 12, through analysis of detection data from the pressure sensor 16 (S13). As a result, if it is determined that the pressure of the gas line 20 rises to the predetermined level or more (4,000 psi), the controller 10 closes the needle valve 13 of the actuator (S14), preventing any further gas from being injected into the gas line 20. Then, the controller 20 detects whether the screw is rotated or not through analysis of a detection signal from the screw rotating detection sensor 19 (S15).

With a result of the analysis of the detection signal from the screw rotating detection sensor 19, if it is determined that the screw starts rotating, the controller 10 detects variation in pressure of the gas line 20 and the barrel 12 through analysis of detection data from the pressure sensors 15 and 16 (S16), and determines whether a pressure difference between the gas line 20 and the barrel 12 is 2,000 psi after calculating the pressure difference (S17).

If it is determined that the pressure difference between the gas line 20 and the barrel 12 is 2,000 psi, the controller 10 issues an instruction for gas injection into the barrel 12 to the gas control valve 14 (S18), thereby causing the gas supplied to the gas line 20 to be injected to the barrel 12 through the gas control valve 14.

At this time, the controller 10 detects change in pressure difference between the gas line 20 and the barrel 12 by the gas injected from the gas line 20 to the barrel 12 on the basis of the analysis of the detection data from the pressure sensor 15 positioned in the barrel 12 and the pressure sensor 16 positioned in the gas line 20 (S19).

If it is determined that the pressure difference between the gas line 20 and the barrel 12 is 1,000 psi, the controller 10 closes the gas control valve 14 while opening the needle valve 13 of the actuator to allow the gas to be supplied to the gas line 20 from the gas compressor 11 while preventing the gas from being injected any more to the barrel 12.

Here, it is preferable that the pressure of the gas line 20 as a reference for opening or closing of the needle valve 13 of the actuator, and the pressure difference between the gas line 20 and the barrel 12 as a reference for opening or closing of the gas control valve 14 be preset to certain values according to a kind of resin or characteristics of an article to be produced through injection molding, respectively.

For example, the pressure of the gas line 20 for opening or closing the needle valve 13 of the actuator can be set to 4,000 psi, the pressure difference between the gas line 20 and the barrel 12 for opening the gas control valve 13 can be set to 2,000 psi, and the pressure difference between the gas line 20 and the barrel 13 for closing the gas control valve 14 can be set to 1,000 psi.

FIG. 8 shows a procedure of controlling the amount of gas injected to the barrel of the injection molding machine via change in pressure of the gas line and the barrel according to a second embodiment of the invention. According to the second embodiment, at first, the gas compressor 11 compresses a gas to 400 bars or more (S22), and the controller 10 and the display 18 are switched on (S23). Then, the controller 10 determines pressures of the gas line 20 and the barrel 12 through analysis of detection signals from the pressure sensors 15 and 16 (S24).

Next, when a trigger signal is input to the controller 10 (s25), the controller 10 detects whether or not a predetermined period of time (2 seconds) is elapsed after receiving the trigger signal by checking time data from the timer 17 (S26), and, if it is determined that the predetermined period of time (2 seconds) has elapsed, it opens the needle valve 13 of the actuator and allows the gas compressed by the gas compressor 11 to be supplied to the gas line 20 (S27).

In this manner, the gas compressed by the gas compressor 11 continues to be supplied to the gas line 20 until a pressure of the gas line 20 rises to a predetermined level (4,000 psi) (S28).

When the pressure of the gas line 20 detected by the pressure sensor 16 rises to the predetermined level (4,000 psi), the controller 10 give an instruction for closing to the needle valve 13 of the actuator to prevent the compressed gas from be supplied from the gas compressor 11 to the gas line 20 (S29).

The, the controller 10 detects whether or not the screw is rotated through analysis of a detection signal from the screw rotating detection sensor 19 (S30), and, if it is determined that the screw is rotated, it opens the gas control valve 14 and allows the gas supplied to the gas line 20 to be injected along with the resin to the barrel 12 (S31).

Needless to say, it is preferable that the gas control valve 14 be opened with passage of the predetermined period of time (2 seconds) after rotation of the screw rather than injecting the gas immediately after rotation of the screw.

While the gas supplied to the gas line 20 is injected to the barrel 12, the controller 10 detects the pressure of the gas line 20 and the pressure of the barrel 12 through analysis of the detection data from the pressure sensors 15 and 16, and displays the pressures on the display 18 (S32).

In this manner, while the gas supplied to the gas line 20 is injected to the barrel 12, the controller 10 detects whether or not the pressure of the gas line 20 is lowered to a predetermined level or less (2,000 psi) as the gas is injected from the gas line 20 to the barrel 12 (S33).

As a result, if the the pressure of the gas line 20 is lowered to a predetermined level or less (2,000 psi), the controller 10 closes the gas control valve 14 while opening the needle valve 13 of the actuator to allow the gas to be supplied to the gas line 20 from the gas compressor 11 while preventing any more of the gas from being injected to the barrel 12 (S34).

Here, the pressure of the gas line 20 for selecting an opening or closing time of the needle vale 13 of the actuator acting to control the gas injection to the gas line 20 and for selecting an opening or closing time of the gas control valve 14 acting to control the gas injection to the barrel 12 of the injection molding machine is preset to a certain value according to a kind of resin or characteristics of an article to be produced through injection molding.

Figure 10:
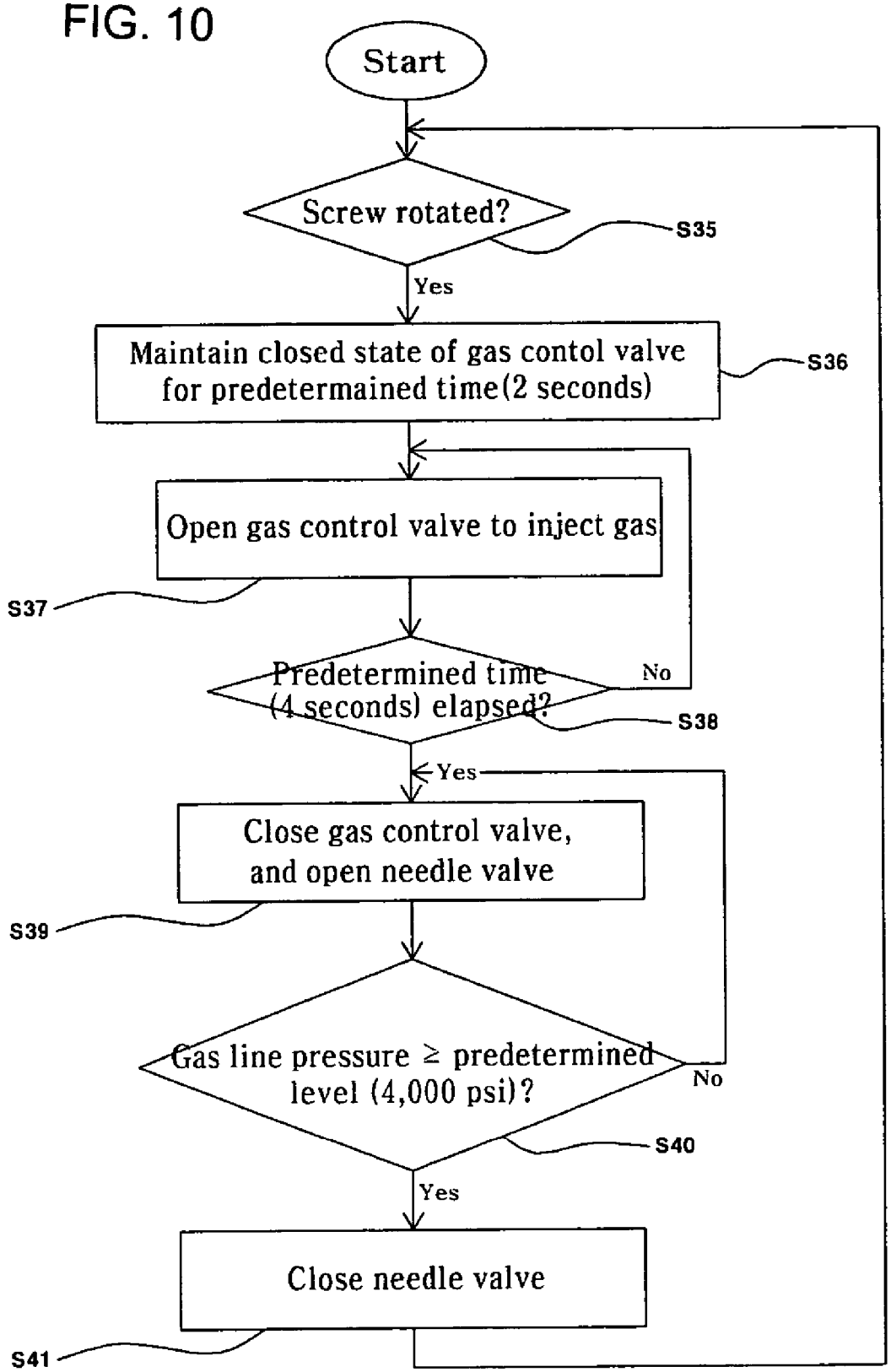

FIG. 10 is a flow diagram illustrating a method for controlling an amount of gas injected to the barrel of the injection molding machine depending on passage of time according to a third embodiment of the invention. According to the third embodiment, at first, the controller 10 detects whether or not the screw is rotated, i.e. whether or not a detection signal is transmitted from the screw rotating detection sensor 19 (S35), in a state wherein a gas of a predetermined pressure (4,000 psi) is supplied to the gas line 20 connected to the barrel 12.

During a waiting state as described above, when the controller 10 receives the detection signal from the screw rotating detection sensor 19 of the injection molding machine, and determines that the screw rotates, it detects whether or not a predetermined period of time (2 seconds) is elapsed after rotation of the screw on the basis of time data from the timer 17. At this time, since an instruction for opening and closing is not issued by the controller 10 to the gas control valve 14 and the needle valve 13 of the actuator, the gas control valve 14 and the needle valve 13 of the actuator are in the closed state (S36).

When the predetermined period of time has elapsed after receiving the detection signal from the screw rotating detection sensor 19, the controller 10 issues an instruction for permitting gas injection into the barrel 12 to the gas control valve 14, and allows the gas to be injected along with a molten resin to the barrel 12 while the gas control valve 14 is opened (S37).

While the gas is injected along with the molten resin to the barrel 12 through the open gas control valve 14, the controller 10 detects whether or not the gas is injected to the barrel 12 for a predetermined time (4 seconds) by checking time data from the timer 17 (S38).

As a result, if it is determined that the gas is injected to the barrel 12 for 4 seconds, the controller 10 gives an instruction for cutting off of the gas injection into the barrel 12 to the gas control valve 14, preventing the gas from being injected any more to the barrel 12, and at the same time, give an instruction for injection of the gas to the gas line 20 connected to the barrel 12 to the needle valve 13 of the actuator, allowing the gas to be injected from the gas compressor 11 to the gas line 20 (S39).

At this time, the controller 10 receives information about a pressure of the gas in the gas line 20 transmitted from the pressure sensor 16 equipped on the gas line 20, and detects whether the pressure of the gas in the gas line 20 is equal to or more than a predetermined level (S40). If the pressure of the gas in the gas line 20 is equal to or more than the predetermined level, the controller 10 issues an instruction to cutoff the gas injection to the needle valve 13 of the actuator, preventing any more of the gas from being injected to the gas line 20 (S41).

Here, an opening or closing time of the gas control valve 14 for controlling the gas injected to the barrel 20 of the injection molding machine, and the pressure of the gas in the gas line 20 connected to the barrel 12 are preset to a certain value according to a kind of resin or characteristics of an article to be produced through injection molding.

Figure 11:
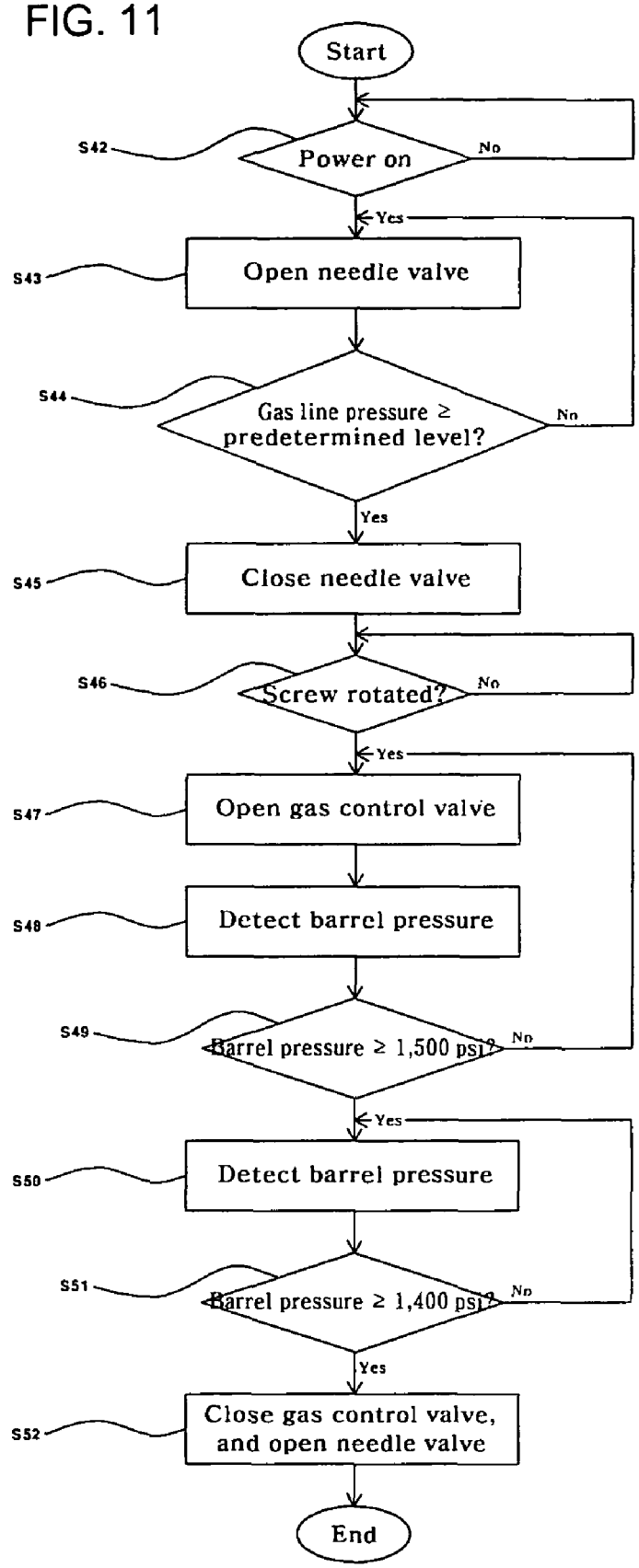

FIG. 11 is a flow diagram illustrating a method for controlling an amount of gas injected to the barrel of the injection molding machine via change in pressure of the barrel according to a fourth embodiment of the invention. According to the fourth embodiment, at first, power is turned on to drive the injection molding machine comprising the gas injecting device (S42). Then, the controller 10 issues an instruction for gas injection into the gas line 20 to the actuator needle valve 13, and allows a gas to be injected from the gas compressor 11 to the gas line 20 (S43).

During the gas injection from the gas compressor 11 to the gas line 20, the controller 10 detects whether or not a pressure of the gas line 20 rises to a predetermined level (4,000 psi) or more, i.e. a pressure sufficient for permitting gas injection into the barrel 12, through analysis of detection data from the pressure sensor 16 (S44). As a result, if it is determined that the pressure of the gas line 20 rises to the predetermined level (4,000 psi) or more, the controller 10 closes the needle valve 13 of the actuator (S45), preventing the gas from being injected any more into the gas line 20. Then, the controller 10 detects whether or not the screw is rotated through analysis of a detection signal from the screw rotating detection sensor 19 (S46).

Although not shown in FIG. 11, the controller 10 waits for a predetermined time after rotation of the screw. Then, after the predetermined time has elapsed, the controller 10 gives an instruction for gas injection from the gas line 20 to the barrel 12 to the gas control valve 14 (S47), allowing the gas supplied to the gas line 20 to be injected to the barrel 12 through the gas control valve 14.

At this time, the controller 10 detects change in pressure of the barrel 12 by the gas injected from the gas line 20 to the barrel 12 on the basis of the analysis of the detection data from the pressure sensor 15 positioned in the barrel 12 (S48).

If it is determined that the pressure of the barrel 12 rises to 1,500 psi (S49), the controller 10 continues detection of the pressure of the barrel 12 (S50), and confirms whether the pressure of the barrel 12 is lowered again to 1,400 psi (S50).

If it is determined that the pressure of the barrel 12 is lowered to 1,400 psi, the controller 10 closes the gas control valve 14 while opening the needle valve 13 of the actuator, allowing the gas supplied from the gas compressor 11 to the gas line 20 while preventing the gas from being injected any more to the barrel 12 (S52).

Here, the pressure of the gas line 20 as a reference for opening or closing of the needle valve 13 of the actuator, and the pressure of the barrel 12 as a reference for opening or closing of the gas control valve 14 are preset to certain values according to a kind of resin or characteristics of an article to be produced through injection molding, respectively.

Figure 12:
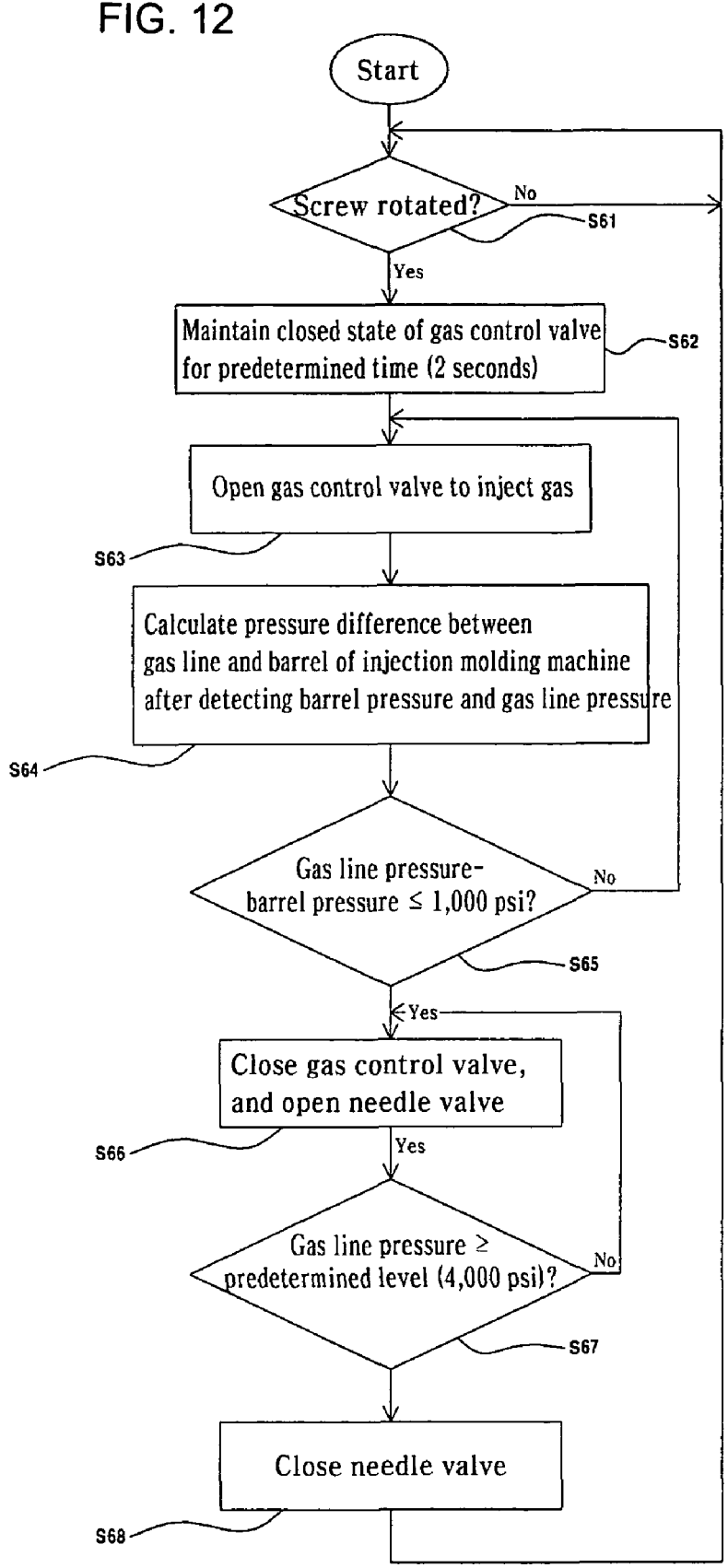

FIG. 12 is a flow diagram illustrating a method for controlling an amount of gas injected to the barrel of the injection molding machine via pressure difference according to a fifth embodiment of the invention. According to the fifth embodiment, at first, the controller 10 detects whether or not the screw is rotated, i.e. whether or not a detection signal is transmitted from the screw rotating detection sensor 19 (S61), in a state wherein a gas of a predetermined pressure (4,000 psi) is supplied to the gas line 20 connected to the barrel 12.

During a waiting state as described above, when the controller 10 receives the detection signal from the screw rotating detection sensor 19, and determines that the screw rotates, it detects whether or not a predetermined period of time (2 seconds) is elapsed after rotation of the screw on the basis of time data from the timer 17. At this time, since an instruction for opening and closing is not given from the controller 10 to the gas control valve 14 and the needle valve 13 of the actuator, the gas control valve 14 and the needle valve 13 of the actuator is in the closed state (S62).

When the predetermined period of time (2 seconds) has elapsed after receiving the detection signal from the screw rotating detection sensor 19, the controller 10 gives an instruction for permitting gas injection into the barrel 12 to the gas control valve 14, and allows the gas to be injected along with a molten resin to the barrel 12 while the gas control valve 14 is opened (S63).

While the gas is injected along with the molten resin to the barrel 12 through the open gas control valve 14, the controller 10 simultaneously detects pressures of the gas line 20 and the barrel 12 through analysis of detection data from the pressure sensors 15 and 16, respectively, and then calculates a pressure difference between the gas line 20 and the barrel 12 (S64).

Next, the controller 10 detects whether or not the pressure difference between the gas line 20 and the barrel 12 is less than or equal to a predetermined pressure (1,000 psi) (S65), and if it is determined that the pressure difference between the gas line 20 and the barrel 12 is less than or equal to a predetermined pressure (1,000 psi), it issues an instruction to cutoff the gas injection into the barrel 12 to the gas control valve 14, preventing any more of the gas from being injected to the barrel 12, and at the same time, issues an instruction for gas injection into the gas line 20, causing the gas to be supplied from the gas compressor 11 to the gas line 20 (S66).

At this time, the controller 10 receives information about a pressure of the gas in the gas line 20 transmitted from the pressure sensor 16 equipped on the gas line 20, and detects whether the pressure of the gas in the gas line 20 is equal to or more than a predetermined level (4,000 psi) (S67). If the pressure of the gas in the gas line 20 is equal to or more than the predetermined level (4,000 psi), the controller 10 issues an instruction to cutoff the gas injection to the needle valve 13 of the actuator, preventing the gas from being injected any more to the gas line 20 (S20).

Here, the pressure difference between the gas line 20 and the barrel 12 as a reference for closing the gas control valve 14, and the pressure of the gas line 20 connected to the barrel 12 are preset to certain values according to a kind of resin or characteristics of an article to be produced through injection molding, respectively.

As apparent from the above description, according to the present invention, the gas injecting device for an injection molding machine is equipped at one side of a cylinder of the injection molding machine, and includes a pin, which is inserted into a gas injection hole of the gas injecting device and has flat sections formed around an outer lower portion of the pin to define gaps between the flat sections and an inner peripheral surface of the gas injection hole such that the gas is injected uniformly through the gaps between the flat sections of the pin and the inner peripheral surface of the gas injection hole, thereby allowing easy formation of a mixture of the gas and a molten resin, as well as simplifying the construction of the gas injecting device.

In addition, since the gas is injected to the cylinder through the gaps in a state wherein the gas injection hole is shielded by the pin, the molten resin is prevented from flowing backwards even under a high pressure of the cylinder, thereby increasing lifetime of the cylinder while reducing time consumption due to repair of the gas injecting device caused by blocking of the gas injection hole.

In addition, the resin and the gas are easily mixed inside the cylinder, thereby allowing production of a highly precise article.

Furthermore, according to the present invention, an amount of gas injected along with the resin to the barrel of the injection molding machine can be accurately controlled according to a pressure difference between the gas line and the barrel, and time data supplied from a timer, thereby allowing an article to be injection molded according to a kind of resin or characteristics of the article.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A method for controlling an amount of gas injected into a barrel of an injection molding machine, comprising the steps of:
   a) opening a needle valve of an actuator to allow the gas to be injected from a gas compressor to a gas line until a pressure of the gas line rises to a first predetermined level, when a gas injecting device of the injection molding machine is turned on;
   b) closing the needle valve of the actuator when the pressure of the gas line rises to the first predetermined level, followed by detecting whether or not a screw is rotated through analysis of a detection signal from a screw rotating detection sensor;
   c) detecting a pressure of the gas line and a pressure of the barrel changed according to the rotation of the screw if it is determined that the screw starts rotating, followed by detecting whether or not a pressure difference between the gas line and the barrel reaches a second predetermined level;
   d) opening a gas control valve to allow the gas to be injected from the gas line to the barrel while monitoring changes in pressures of the gas line and the barrel, if it is determined that the pressure difference between the gas line and the barrel reaches the second predetermined level; and e) closing the gas control valve while opening the needle valve of the actuator to allow the gas to be injected from the gas compressor to the gas line, if it is determined that the pressure difference between the gas line and the barrel reaches a third predetermined level.

2. The method as set forth in claim 1, wherein the second predetermined level is 2,000 psi, and the third predetermined level is 1,000 psi.

3. The method as set forth in claim 1, wherein the pressure of the gas line as a reference for opening or closing of the needle valve of the actuator, and the pressure difference between the gas line and the barrel as a reference for opening or closing of the gas control valve are preset to certain values according to a kind of resin or characteristics of an article to be produced through injection molding, respectively.

4. The method as set forth in claim 3, wherein the pressure difference between the gas line and the barrel for opening the gas control valve is 2,000 psi, and the pressure difference between the gas line and the barrel for closing the gas control valve is 1,000 psi.

5. A method for controlling an amount of gas injected into a barrel of an injection molding machine, comprising the steps of:

a) reading pressures of a gas line and the barrel through analysis of detection data from pressure sensors after switching a controller and a display on in a state wherein a gas is compressed to 400 bars or more in a gas compressor;

b) opening a needle valve of an actuator to allow the gas to be injected to the gas line until the pressure of the gas line rises to a first predetermined level when a predetermined period of time has passed after a trigger signal is input;

c) closing the needle valve of the actuator while detecting whether or not a detection signal is transmitted from a screw rotating detection sensor of the injection molding machine, if it is determined that the pressure of the gas line rises to the first predetermined level;

d) opening a gas control valve to allow the gas to be injected from the gas line to the barrel if it is determined that the detection signal is input from the screw rotating detection sensor;

e) detecting a pressure of the gas line and a pressure of the barrel while injecting the gas from the gas line to the barrel, followed by displaying the pressures on a display; and f) closing the gas control valve and opening the needle valve of the actuator to allow the gas to be injected from the gas compressor to the gas line while preventing the gas from being injected to the barrel, if it is determined that the pressure of the gas line is lowered to a second predetermined level or less due to gas injection from the gas line to the barrel.

6. The method as set forth in claim 5, wherein the pressures of the gas line for selecting an opening or closing time of the needle vale of the actuator acting to control gas injection to the gas line and for selecting an opening or closing time of the gas control valve acting to control the gas injection to the barrel of the injection molding machine are preset to certain values according to a kind of resin or characteristics of an article to be produced through injection molding.

7. A method for controlling an amount of gas injected to a barrel of an injection molding machine, comprising the steps of:

a) awaiting an instruction for opening or closing of a gas control valve from a controller while maintaining a closed state of the gas control valve for a predetermined time after receiving a detection signal from a screw rotating detection sensor of the injection molding machine;

b) opening the gas control valve to allow the gas to be injected along with a molten resin to the barrel according to an instruction for opening of the gas control valve from the controller with passage of the predetermined time after receiving the detection signal from the screw rotating detection sensor;

c) closing the gas control valve according to an instruction for closing of the gas control valve from the controller, while opening the needle valve of the actuator to allow the gas to be injected to the gas line connected to the barrel according to an instruction for opening of the needle valve of the actuator from the controller, after injecting the gas to the barrel for a predetermined time on the basis of time data from a timer in a state wherein the gas control valve is open; and d) closing the needle valve of the actuator to cutoff gas injection to the gas line connected to the barrel according to an instruction for closing of the needle valve of the actuator from the controller after the gas is injected to the gas line connected to the barrel of the injection molding machine until the pressure of the gas line rises to a predetermined level.

8. The method as set forth in claim 7, wherein an opening or closing time of the gas control valve for controlling the gas injected to the barrel, and the pressure of the gas in the gas line connected to the barrel are preset to certain values according to a kind of the resin or characteristics of an article to be produced through injection molding.

9. The method as set forth in claim 7, wherein the gas is injected under a predetermined pressure to the gas line connected to the barrel before a screw of the injection molding machine begins rotating.

10. A method for controlling an amount of gas injected into a barrel of an injection molding machine, comprising the steps of:

a) opening a needle valve of an actuator to allow the gas to be supplied from a gas compressor to a gas line until a pressure of the gas line rises to a first predetermined level when a gas injecting device of the injection molding machine is turned on;

b) closing the needle valve of the actuator while monitoring whether or not a screw is rotated through analysis of a detection signal from a screw rotating detection sensor, if it is determined that the pressure of the gas line rises to the first predetermined level;

c) opening a gas control valve to allow the gas to be injected from the gas line to the barrel while detecting whether or not a pressure of the barrel rises to a second predetermined level, when a predetermined time of period has passed after the screw starts rotating;

d) detecting whether or not the pressure of the barrel is lowered again to a third predetermined level, if it is determined that the pressure of the barrel rises to the second predetermined level; and e) closing the gas control valve to cutoff the gas injection to the barrel while opening the needle valve of the actuator to allow the gas to be injected from the gas compressor to the gas line, if it is determined that the pressure of the barrel is lowered to the third predetermined level.

11. The method as set forth in claim 10, wherein the pressure of the gas line as a reference for opening or closing of the needle valve of the actuator, and the pressure of the barrel as a reference for opening or closing of the gas control valve are preset to certain values according to a kind of resin or characteristics of an article to be produced through injection molding, respectively.

12. A method for controlling an amount of gas injected to a barrel of an injection molding machine, comprising the steps of:
   a) awaiting an instruction for opening or closing of a gas control valve from a controller while maintaining a closed state of the gas control valve for a predetermined time after receiving a detection signal from a screw rotating detection sensor of the injection molding machine;
   b) opening the gas control valve to allow the gas to be injected along with a resin to the barrel according to an instruction for gas injection to the barrel from the controller with passage of the predetermined time after receiving the detection signal from the screw rotating detection sensor;
   c) detecting a pressure of the gas line and a pressure of the barrel changed as a result of the gas injection through the open gas control valve while monitoring whether or not a pressure difference between the gas line and the barrel is lowered to a first predetermined level or less;
   d) closing the gas control valve to cutoff the gas injection to the barrel according to an instruction for cutting off of the gas injection to the barrel from the controller, while opening the needle valve of the actuator to allow the gas to be supplied from the gas compressor to the gas line according to an instruction for the gas injection to the gas line connected to the barrel, if it is determined that the difference between the pressure of the gas line and the pressure of the barrel is lowered to the first predetermined level or less; and
   e) closing the needle valve of the actuator to cutoff the gas injection to the gas line connected to the barrel according to an instruction for closing of the needle valve of the actuator from the controller, when the gas is injected to the gas line connected to the barrel of the injection molding machine until the pressure of the gas line rises to a second predetermined level.

13. The method as set forth in claim 12, wherein the pressure difference between the gas line and the barrel as a reference for closing of the gas control valve, and the pressure of the gas line connected to the barrel are preset to certain values according to a kind of resin or characteristics of an article to be produced through injection molding, respectively.

14. The method as set forth in claim 12, wherein the gas is injected under a predetermined pressure to the gas line connected to the barrel before a screw of the injection molding machine begins rotating.

* * * * *